US008225100B2

(12) United States Patent
Ciet et al.

(10) Patent No.: US 8,225,100 B2
(45) Date of Patent: Jul. 17, 2012

(54) HASH FUNCTIONS USING RECURRENCY AND ARITHMETIC

(75) Inventors: Mathieu Ciet, Paris (FR); Michael L. Crogan, Palo Alto, CA (US); Augustin J. Farrugia, Cupertino, CA (US); Nicholas T. Sullivan, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 803 days.

(21) Appl. No.: 12/263,293

(22) Filed: Oct. 31, 2008

(65) Prior Publication Data

US 2010/0115230 A1 May 6, 2010

(51) Int. Cl.
*H04L 29/06* (2006.01)
(52) U.S. Cl. .......................... 713/180; 713/155; 380/28
(58) Field of Classification Search ................ 380/28; 713/155

See application file for complete search history.

(56) References Cited

U.S. PATENT DOCUMENTS

| 7,720,219 | B1 * | 5/2010 | Olson et al. ..................... 380/28 |
| 2003/0074341 | A1 * | 4/2003 | Blackburn et al. ................. 707/1 |
| 2006/0112264 | A1 * | 5/2006 | Agarwal ....................... 713/150 |
| 2010/0100724 | A1 * | 4/2010 | Kaliski, Jr. .................... 713/155 |

OTHER PUBLICATIONS

"Galton-Watson process," From Wikipedia, the free encyclopedia, Wikimedia Foundation Inc., San Francisco, CA. (Available at http://en.wikipedia.org/wiki/Galton-Watson_process, last visited on Aug. 8, 2008.).

* cited by examiner

*Primary Examiner* — William Goodchild
(74) *Attorney, Agent, or Firm* — Novak Druce + Quigg LLP

(57) ABSTRACT

Aspects relate to systems and methods for implementing a hash function using a stochastic and recurrent process, and performing arithmetic operations during the recurrence on portions of a message being hashed. In an example method, the stochastic process is a Galton-Watson process, the message is decomposed into blocks, and the method involves looping for a number of blocks in the message. In each loop, a current hash value is determined based on arithmetic performed on a previous hash value and some aspect of a current block. The arithmetic performed can involve modular arithmetic, such as modular addition and exponentiation. The algorithm can be adjusted to achieve qualities including a variable length output, or to perform fewer or more computations for a given hash. Also, randomizing elements can be introduced into the arithmetic, avoiding a modular reduction until final hash output production.

33 Claims, 5 Drawing Sheets

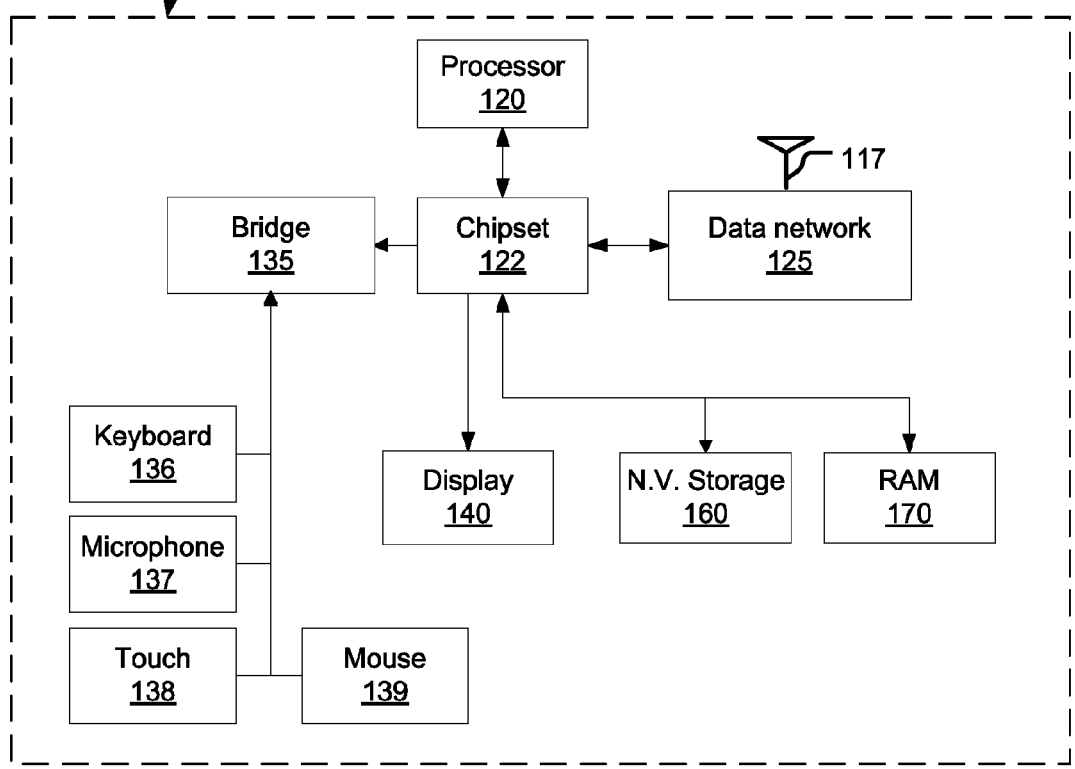

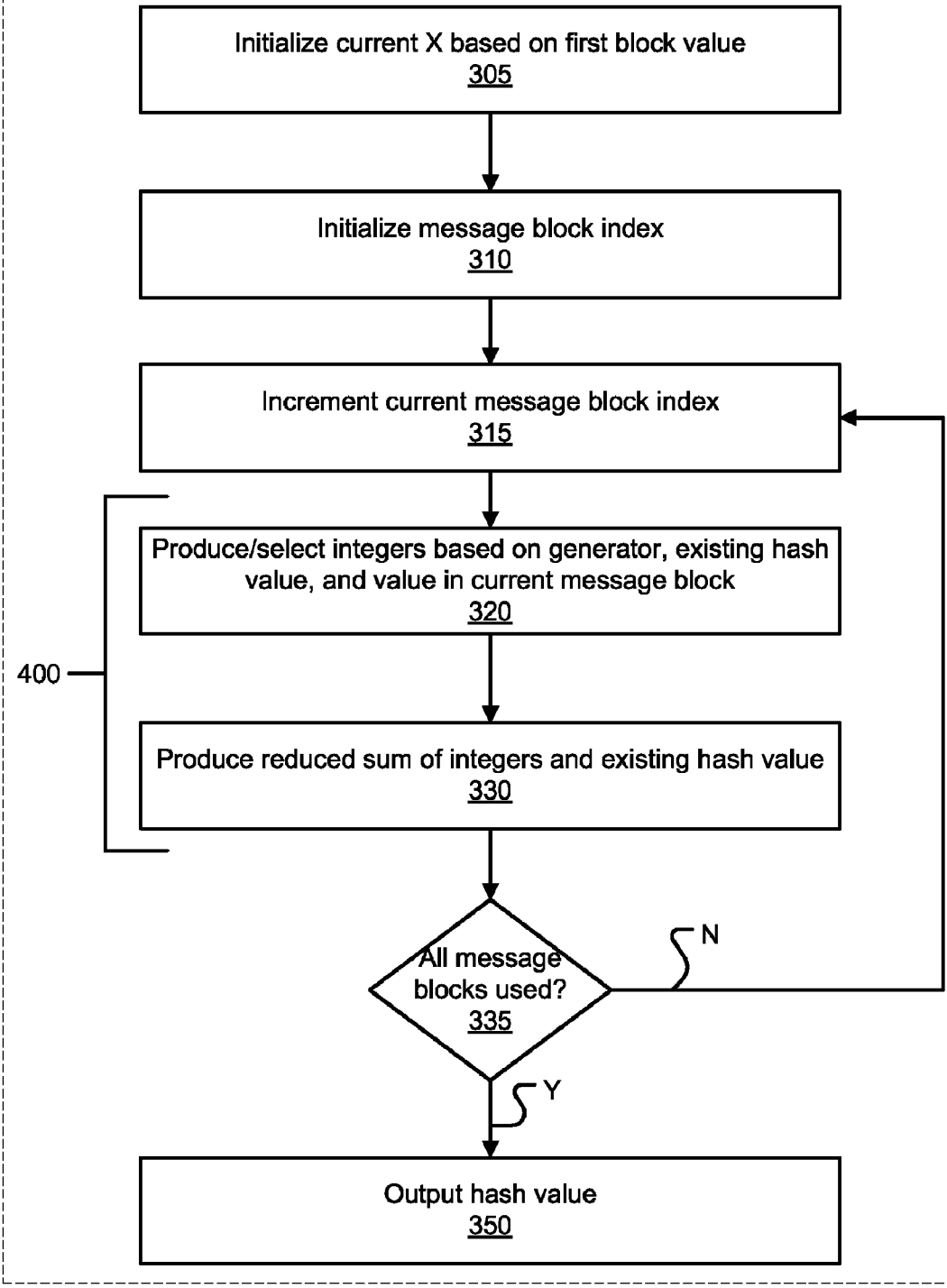

HASH FUNCTIONS USING RECURRENCY AND ARITHMETIC

FIELD

The following relates to a hash function and variations thereof that can be use to produce hashes from messages.

RELATED ART

Hash functions can be used for a variety of purposes in the areas of authentication, encryption, document signing and so on. Properties of hash functions for most such purposes have a baseline common set of desirable characteristics. These characteristics include preimage resistance, meaning that it is computationally hard to determine a document that can be hashed to a specified hash value. Another desired characteristic is second preimage resistance, meaning that it is difficult to find a second input that hashes to the same hash value as a specified input. A further desired characteristic is that different documents should reliably produce different hash values (non-collision).

Systems and methods for producing hash functions having these properties, and other properties, remain the subject of ongoing research. Also, such other properties may be selected based on a particular application or system. For example, these other properties can be selected based on a type of data or a size of data expected to be hashed, as well as an amount of computation resource available to perform the hashing, whether a system performing the hashing is controlled by an untrusted party, and so on. The following description relates to a hash function that can be adapted to use varying amounts of computation power, variable message block lengths, produce variable length hash outputs, and obfuscate its operations.

SUMMARY

The following disclosure relates to providing hash functions for use in creating hashes of messages, such as files, and other logically-related data. The hashes can be used to name files and for other purposes. Implementations can be adapted to use varying amounts of computation power, to operate with variable message block lengths, to produce variable length hash outputs, and to use randomization to obfuscate and to vary operations performed in the algorithm.

Particular aspects can include that an intermediate hash value can be calculated for each block of a sequence of message blocks. Each intermediate hash value depends in some way on an intermediate hash value calculated for a previous block. In an example, a number of integers selected from a defined integer group is determined based on contents of a prior block's intermediate hash value. Portions of each intermediate hash value can be incorporated into a bitstring that can be shifted to accommodate the portion incorporated. The block sizes into which a message is segmented can be varied, and the shifting of the bitstring and the incorporating of the intermediate hash value portions can be adapted accordingly. In many of these examples, an intermediate hash value is generated for each block, and also thus also can be considered a block-specific hash value.

An example mechanism for the integer selection is a modular exponentiation of a generator of the integer group, which is a subgroup of a larger group. The power to which the generator is raised is based on contents of a message block being considered and an index incremented for each integer selection. Randomization can be added in the modular exponentiation by incorporating a selection of randomly selected numbers coprime to a prime p used to define the larger group. Thus, modular arithmetic can be incorporated into a recurrent hash function. Since equivalent modular arithmetic operations can produce the same result, hash functions according to this description are amenable to implementation variation.

Such adaptations and variations include ability to vary block lengths when segmenting a message, and/or between different messages, to produce a variable length output hash, to randomize or vary the actual computations used to arrive at a repeatable (i.e., deterministic) hash value, and to diffuse computations relating to one message block into computations relating to a different message block. Further variations, modifications, and implementations would be apparent to those of ordinary skill in the art from these disclosures.

BRIEF DESCRIPTION OF THE DRAWINGS

FIG. 1A depicts a plurality of systems that can communicate with each other, and in which hash functions according to these disclosures can be implemented;

FIG. 1B illustrates a block diagram of example components of a system that be used in FIG. 1A;

FIG. 2 depicts using hash values obtained according to these disclosures as file identifiers;

FIG. 3 depicts a first method for obtaining a hash of a message according to these disclosures;

DESCRIPTION

Figure 4:
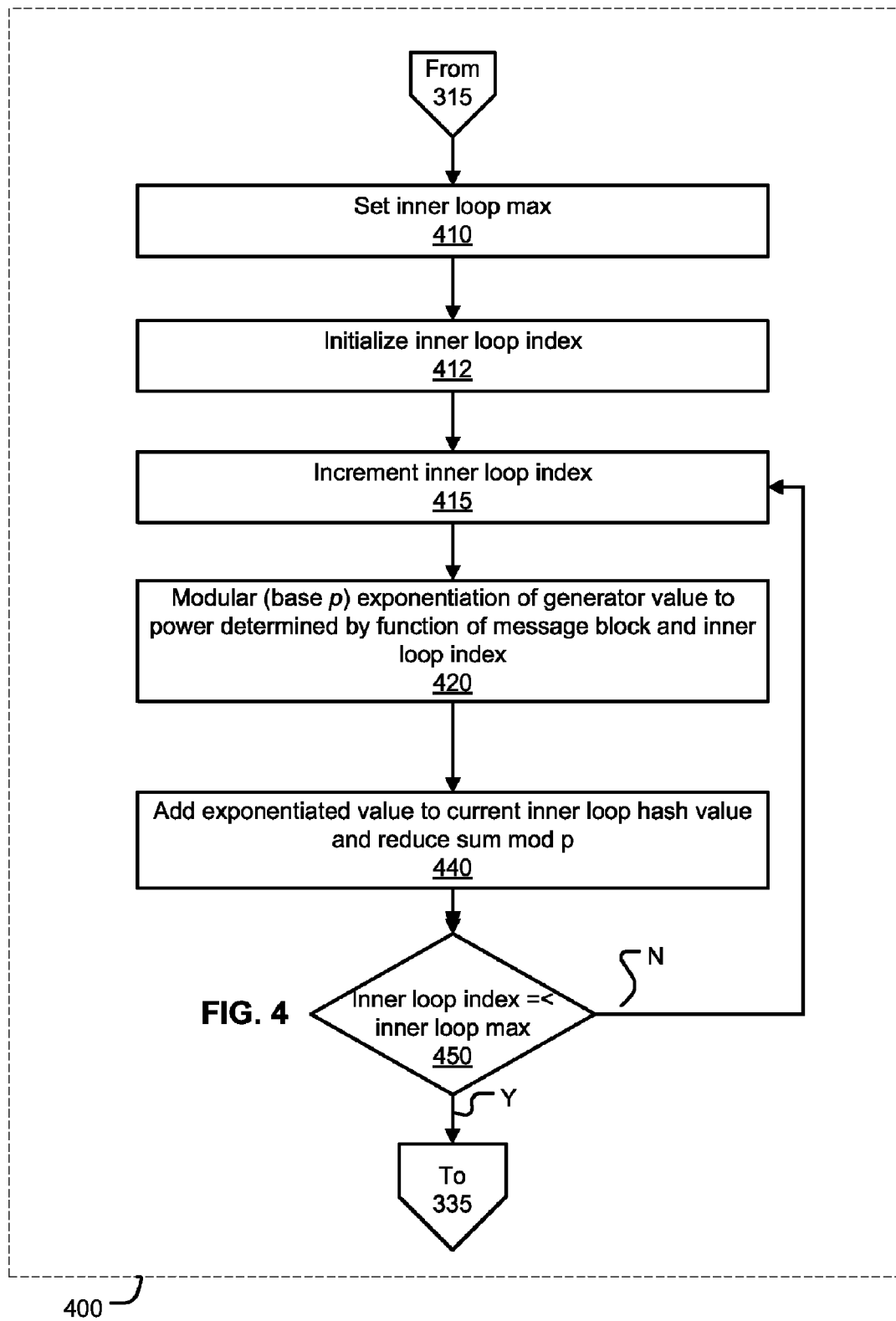
FIG. 4 depicts steps of a method that can be used in the method of FIG. 3.

The following relates to hash functions that can be implemented in electronic devices, such as desktop and laptop computers, handheld devices, such as digital assistances, telephones, and so on. FIG. 1A illustrates a plurality of systems, 100 and 175, that can communicate with each other, and in which hash functions according to these disclosures can be implemented.

FIG. 1B illustrates an example construction of system 100 depicted in FIG. 1A. System 100 includes a processor 120, representative of any number of physically and/or logically distinct resources capable of executing software, firmware, and hardware configured to perform identified computations. Processor 120 communicates with a chipset 122 that can control input to and output from processor 120. In this example, chipset 122 outputs information to display 140, and can read and write information to non-volatile storage 160, which can include magnetic media, and solid state media, for example. Chipset 122 also can read data from and write data to ram 170. A bridge 135 for interfacing with a variety of user interface components can be provided for interfacing with chipset 122. Such user interface components can include a keyboard 136, a microphone 137, touch detection and processing circuitry 138, a mouse 139, or similar pointing device, and so on. Chipset 122 also can interface with one or more data network interfaces 125, which can have different physical interfaces 117. Such data network interfaces can include interfaces for wired and wireless local area networks, for broadband wireless networks, as well as personal area networks. Some applications of the hashing disclosures herein can include receiving data from system 175 through physical interface 117 through data network 125, and in preparation to store the data in non-volatile storage 160, system 100 can calculate a hash value for the data, and use that hash value as an identifier for a file containing the received data. Further examples relating to file naming can include generating data through processing performed on processor 120, and which is to be stored in ram 170 and/or non-volatile storage 160.

FIG. 2 illustrates a tabular mapping 160 between hash values used as file identifiers and correlated to data that can be used to identify a location to retrieve a file. Thus, FIG. 2 illustrates one example usage of the hashes produced according to these disclosures.

The following describes aspects of hash functions based on a stochastic process, which provide also for the inclusion of arithmetic operations, which can be used to introduce, for example, randomness into computations used in arriving at a hash value based on a given message. Another term that can be used to describe a hash of a message include "message digest". The stochastic process can be a Galton-Watson process, which is a process that evolves according to the recurrence identified in Equation 1, below, where each $\xi_j$ is a sequence of natural valued random variables. In this process, each current state influences a next state (or in an alternative phraseology, a previous state influences a current state). The following explains how this sort of process can be used to implement a hashing procedure, which can include a variety of additional characteristics and/or variations.

$$X_{n+1} = \sum_{j=1}^{X_n} \xi_j^{n+1} \qquad \text{Equation 1}$$

A hash function can operate on a given item of data, such as a message, or a file, which in this example, is identified as M. M can be decomposed into a number of blocks (b). In one example, each block can be a byte of M, or multiple bytes of M. A block need not be a multiple of 8 bits (i.e., blocks need not be byte-sized); instead blocks can be any number of bits, even for example, fewer than 8 bits, such as 5 bits. Equation 2 illustrates that concatenation of the blocks yields the original message M. Generally, an order of the blocks either is implicitly or explicitly maintained.

$$M = m_0 \| m_1 \| \ldots m_{b-1} \qquad \text{Equation 2}$$

These aspects are used in a first example, described below. This first example involves using a prime number p and a prime number q that divides p−1 and is not equal to 2. In an example, q=(p−1)/2. An integer g is selected from the integers less than p and has an order q, and so g is a generator of a subgroup of Z/(p) with order q.

In view of the above, the first example provides for implementing an algorithm according to the pseudocode of Example 1 and as illustrated in FIG. 3.

The following examples include one or more loops in which a hash X is updated or otherwise modified, such that the hash X has a current value in each iteration, and each current value is identified by a subscript (e.g., the initialized value for hash X is referenced as $X_0$).

In step 1, below, hash X is initialized to value $X_0$ based on a first block, $m_0$, of the message M. Then, a first loop is begun based on the number of blocks, b, in the message. In this first example, the loop is from 1 to b−1.

A subsequent value for the hash, e.g., $X_j$, j=1, is initialized to 0. An inner loop is executed for a number of times dependent on the prior hash value. For example, at the start, if $m_0$ were a byte, then the inner loop could execute from one time if $m_0$ were all zeroes up to 255 times if $m_0$ were all ones.

Often, padding is added to messages that can affect message contents, and such padding can be selected to cause a certain initial repetition of the inner loop, e.g., block $m_0$ may comprise padding in addition to message contents (or alternatively, message contents can be viewed as including padding). The padding can be according to known forms of padding, such as those used with other hash functions, including SHA1 and SHA2, and need not be described in detail herein. Other examples of indexing for inner loops according to this description are provided below.

In the inner loop, the current hash value is incremented using modular arithmetic on powers of the generator g. For example, the current hash value $X_j$ can be added to a value determined by 1) raising g to a power determined based on a value in a block $m_j$ of the message (i.e., a message block subsequent to a previously used message block), and based on the inner loop index and 2) reducing the value determined in 1) modulo p. In implementations, 1) and 2) above can be performed using any of a variety of known modular multiplication/exponentiation methodologies designed to make more tractable the problem of raising a number to a large power in modular arithmetic.

---

Algorithm Example 1

```
1       X_0 = m_0 ;
2       for ( j = 1; j < b, j++ )
2.1         X_j = 0 ;
2.2         for (i = 1; i < X_{j-1}; i ++ )
2.2.1           X_j = (X_j + (g^{m_j})^i) mod p ;
3       return X_{b-1}
```
---

In one aspect, the methodology of Example 1 can be viewed as selecting integers of order q from the field of integers less than p. This is because raising g to a power as shown and reducing mod p results in such an integer. A number of integers selected depends on a prior value of the hash, while the integers selected depend on contents of a current message block. Different formulations of such dependencies can be provided. The selected integers are summed with the existing hash value and reduced.

The summation and reduction can occur in different ways. For example, each integer can be reduced before summation, and the summation can be reduced. The summation can be reduced after adding each integer. Still further, all the integers can be summed and reduced, then added to the hash value, and that sum reduced. Therefore, the usage of addition and reduction here provides for a variety of implementations to result in a reduced summation of the selected integers and the pre-existing hash value.

FIG. 3 illustrates steps of a method 300 that includes initializing (step 305) a hash value X to a first block value, initializing (step 310) a message block index, j, and incrementing (step 315) a current message block index value. Method 300 also includes producing and/or selecting integers (step 320) based on using the generator g and the existing hash value. The pseudocode of Example 1 illustrates one approach to accomplishing step 320. The integers selected are summed and added to the existing hash value (step 330). Such summing can occur in an inner loop, as in the Example 1 pseudocode.

So long as all message blocks are not yet used (decision 335), another iteration is made, and after all message blocks are used, then a hash value can be outputted (step 350). The usage of all message blocks is a convention, in that if fewer than all blocks of a given file were used in determining a hash value, then the message could be defined based on the blocks that were used. More practically, if a given message block were not used in determining a hash value, then that hash value would not change if the contents of that unused block were changed, which would be contradictory to generally desired characteristics of a hash function.

Reducing Computation

Implementations can be further varied from the examples provided above, to accomplish differing objectives. For example, Example 1 included that the inner loop for a subsequent block was executed a number of times directly dependent on a hash value for a prior block. Instead, a partial reduction of a number of times the inner loop is executed can be made.

Turning now to Example 2, the operations of the inner loop (step 2.2.1) of Example 1 may be executed many times, as the hash value used to limit a number of times the inner loop is executed ($X_{j-1}$, where j is a current index for the inner loop) can grow quite large. Also, exponentiation of large numbers can be computationally expensive. Therefore, it may be useful to reduce the number of operations in this inner loop.

Thus, Example 2 shows an example of implementing a reduced-size inner loop that maintains the dependence on contents of a hash value for a prior message block. In particular, Example 2 shows that the inner loop can be executed a number of times $X_{j-1}$ mod q, which would be a substantially smaller number. With reference to Step 320 of FIG. 3, fewer integers would be selected for use in determining a hash value for a current message block in such an implementation.

| Algorithm Example 2 | |
|---|---|
| 1 | $X_0 = m_0$ ; |
| 2 | for ( j = 1; j < b, j ++ ) |
| 2.1 | $X_j = 0$ ; |
| 2.2 | for (i = 1;i < $X_{j-1}$ mod q;i ++ ) |
| 2.2.1 | $X_j = (X_j + (g^{m_j})^i)$ mod p ; |
| 3 | return $X_{b-1}$ |

Another variant is to reduce further a size of the inner loop by also reducing modulo a power of 2 (e.g., the inner loop can be executed no more than ($X_{j-1}$ mod q)mod $2^f$ times, where f can be a given number of bits, such as 8 bits or 16 bits). Nevertheless, in these variants, a number of times that an inner loop for a subsequent block is executed remains dependent on a hash value produced for the prior message block.

It is also known to partially or entirely "unroll" a loop, or when code is finally implemented on a given system, it may be implemented as a parallelized form, such as with Single Instruction Multiple Data (SIMD) operations. Thus, the looping examples above are not intended to limit implementations according to the description. Instead, such implementations can be adapted as desired.

FIG. 3 showed steps of a method 300 that included step 320 of producing or selecting integers based on the generator g, a hash value for a prior block, and a value of a current message block. Method 300 also included step 330 which represented that the selected integers were summed and ultimately reduced. FIG. 4 illustrates a method 400 depicting more particular steps of an implementation of such an integer selection, summation and reduction process, resulting in a hash value for a message block. Method 400 thus can be used as a component of method 300.

FIG. 4 illustrates steps of method 400 for selecting and using the integers described in method 300 of FIG. 3. Method 400 also can be understood with reference to the pseudocode of Example 1 and Example 2. In particular, steps 320 and 330 of method 300 can be implemented according to method 400.

Method 400 includes setting (step 410) an inner loop iteration maximum. Such maximum can be up to a value of a hash value calculated for the prior message block, and as discussed above, can be reduced modulo q or by other values. Method 400 also includes initializing (step 412) the index i for the inner loop. Method 400 also includes incrementing (step 415) an index for the inner loop. The incrementing can occur in various places in the loop, as one of ordinary skill would appreciate, taking into account appropriate indexing adjustments. For example, the incrementing can occur after the inner loop calculations, and the initialization step 412 can be changed accordingly.

Method 400 also includes performing a modular exponentiation (step 420) of g to a value determinable as a function of a current message block and the inner loop index. In an example, the function represents a multiplication between the current message block and the inner loop index.

Method 400 also maintains a hash value $X_j$ for the current message block, where j identifies a current message block, and can be an outer loop index. Step 430 includes adding the value from step 420 (i.e., the modular exponentiation) to $X_j$ and reducing that value modulo p. The example shows that the summed value is intended to be reduced by modulo p such that at least by the time the inner loop completes, the hash value for that block is a value reduced to less than p. Often, modular exponentiation and multiplication algorithms perform intermediate reductions in evaluating a given expression. Thus, method 400 includes any of a variety of approaches to evaluating the exponentiation of g to a power determined as a function of the current message block and a hash value for a prior block, and adding that value modulo p to a running total.

When the inner loop is completed (comparison 450 between inner loop max and inner loop index), then method 400 completes, and method 300 of FIG. 3 can continue at step 335. Thus, method 400 is a more particular example of selecting integers to be used in the summation shown in step 2.2.1 of Examples 1 and 2.

Variable Message Block Length and Variable Hash Output Length

A still further variant provides for a variable length output (i.e., the hash value outputted can be of different lengths) as well as variable length message blocks. To allow this more general case to encompass the previous examples, a function, h(x), represents a length (number of iterations of) the inner loop illustrated in the prior examples. The function h(x) can be defined to include h(x)=x (e.g., Example 1) as well as reductions, such as h(x)=x mod q, h(x)=x mod $2^f$ or h(x)=(x mod q)mod $2^f$, where f can be selected arbitrarily and can be, for example, 8 or 16 bits. Other h(x) may be provided, and these example h(x) are not limiting. This notation is used in Example 3, below.

By way of further explanation, in the above examples, a hash value was determined for each message block by summing modulo p a selection of integers. In an example, the integers were selected based on contents of a current message block (i.e., subsequent the prior block) and on an incrementing index (e.g., an incrementing index of an inner loop executed for up to a prior hash value, or some reduction thereof). Example 3 builds on these disclosures and further illustrates an example of allowing variable length message blocks, as well as a selectable length hash value output.

The pseudocode of Example 3 also uses the notation of a value determined for each successive message block, $X_j$, where j varies to reach all blocks in the message. In the above examples, a final X produced (i.e., after reaching all message blocks) was used as a hash value to be outputted as a hash value for the message M. In Example 3, a value tmp is maintained based on selecting bits from each $X_j$ value, and at least a portion of tmp can be outputted as the hash value for the message.

Example 3 shows that an initial X, $X_0$, is initialized to an initial block of the message, $m_0$. More broadly, $X_0$ can be initialized based on $m_0$, rather than a direct assignment. The value tmp also is shown initialized based on contents of $m_0$, although another suitable initialization convention can be employed.

An outer loop, with an index j is provided. The index j is incremented for each iteration of the loop, and can be incremented at a beginning or an end of the loop depending on initialization of j. For convenience, $X_j$ refers to a hash value currently being produced, using a current message block, while $X_{j-1}$ refers to a hash value determined from processing for a prior message block. Example 3 also shows that $X_j$ is initialized to 0, although other suitable initializations can be provided.

Example 3 continues that tmp can be shifted by a number of bits in the $m_j$ message block (the number of bits for block $m_j$ identified as $[[m_j]]$). The shifting of tmp is intended to illustrate that tmp should be shifted prior to further incorporation of bits from a subsequent message block.

An inner loop is provided that can be executed for a varying number of times based on function h(x) (described above, with respect to Example 2). The $X_j$ value can be modified as shown. After the inner loop is complete, a selection of bits from $X_j$ is incorporated into tmp. The incorporation is done in this example by masking (step 3.4) a selection of the bits using an AND operation between $X_j$ and a bitstring having a binary 1 in any bit position to be retained and binary zero elsewhere. The retained bits are OR'ed (also step 3.4) with existing bits of tmp to produce a tmp value as modified by a hash value $X_j$ produced for the $m_j$ message block. Any other suitable Boolean operation can be substituted for the OR in step 3.4, such as XOR, and AND.

Algorithm Example 3

```
1       X_0 = m_0 ;
2       tmp = 0 ;
3       for ( j = 1; j < b, j ++ )
3.1         X_j = 0 ;
3.2         tmp = tmp << [[m_j]] ;
3.3         for (i = 1;i < h(X_{j-1});i ++ )
3.3.1           X_j = (X_j + (g^{m_j})^i) mod p ;
3.4         tmp |= X_j & ones{m_j} ;
4       tmp = tmp << r ;
5       tmp |= X_{j-1} & ones{r} ;
6       return tmp
```

After the outer loop (after step 3.4) is complete, then it is shown that tmp is shifted (step 4) once more outside of the outer loop for a number of bits determined based on r, which is used to define a length of the final hash to output. In an example, r can indicate a number of bytes to be outputted in the final hash. If r is formatted as a number of bytes, then r can be multiplied by 8 to get to a number of bits for usage in relevant steps. For example, in step 4, tmp is shifted by r. In step 5, a portion of $X_{j-1}$ is incorporated into tmp similar to step 3.4, as discussed above.

The variable r provides a general representation of a shift for a desired number of bits. In practice, r can be expressed in different ways. For example, if r is formatted as a number of bytes, then multiplying r by 8 allows for an appropriately-sized shift (tmp=tmp<<8·r). The variable r also can directly represent a number of bits, even a number of bits smaller than a byte, or an odd number of bits, and so on.

As discussed, in step 3.4, a portion of $X_j$ to be incorporated into tmp can be determined based on r. Present step 3.4 can be modified so that a present value of tmp can be updated using an XOR between a present value of tmp and a selection of $X_j$ determined based on r (e.g., tmp=tmp⊕($X_j$ & ones{r} or tmp=tmp⊕($X_j$⊕ones{r}).) Step 5 also can be implemented as an XOR, in similar fashion.

Randomization/Obfuscation

A further variation to the examples can include implementing randomization in performing the described modular exponentiation and addition. Such randomization can be provided using an equivalent form of computation. For example, integers $R_1$ and $R_3$ are selected from integers coprime to p (since p is prime, from all number less than p), $R_3$ is non-zero, and $R_2$ is selected from integers less than prime q. $R_1$, $R_2$, and $R_3$ can be varied in different rounds of the algorithm. The integer selection can proceed randomly or pseudorandomly. The Example 3 pseudocode can be modified as shown in Example 4, below, using these numbers in the modular exponentiation. Because $R_1$, $R_2$, and $R_3$ and p can be preselected, respective multiplications of these values can also be performed in advance.

Algorithm Example 4

```
1       X_0^* = m_0 ;
2       tmp = 0 ;
3       for ( j = 1; j < b, j ++ )
3.1         X_j^* = 0 ;
3.2         tmp = tmp << [[m_j]] ;
3.3         for (i = 1;i < h(X_{j-1}^*);i ++ )
3.3.1           X_j^* = (X_j^* + (g + R_1 p)^{(m_j i + R_2 q)}) mod R_3 p ;
3.4         X_j = X_j^* mod p ;
3.5         tmp |= X_j & ones{m_j} ;
4       tmp = tmp << r ;
5       tmp |= X_{j-1} & ones{r} ;
6       return tmp
```

The pseudocode of Example 4 illustrates that a respective $X^*_j$ value is calculated in an inner loop for each block of the message (excepting the first block, for which an $X^*_0$ is initialized). This $X^*_j$ value is maintained for use in the function that determines how many times the inner loop (steps 3.3 and 3.3.1) is iterated for the subsequent message block (i.e., the $j^{th}$ message block for $X^*_{j-1}$). After the inner loop is complete for each block, its $X^*_j$ value is reduced mod p in step 3.4 to produce $X_j$, while preserving $X^*_j$. Then, $X_j$ is used as described with respect to Example 3 above.

Here also, the general variable r is used to express a number that can be expressed as a number of bytes desired in a hash value, such that multiplication by 8 to arrive at a number of bits to shift is performed to arrive at the r value used in steps 4 and 5. More broadly, r can be an integer determining a number of bits to shift, and is not indicative necessarily of a number of bytes. As an alternative to shifting tmp by a size of $m_j$, tmp also can be shifted based on r, as described with respect to Example 3, above. Here also, tmp can be updated using an XOR operation between the current value of tmp and a selection of bits from $X_j$ determined based on r. Step 5 also can be implemented as an XOR, similar to step 3.5 of Example 4.

Figure 5:
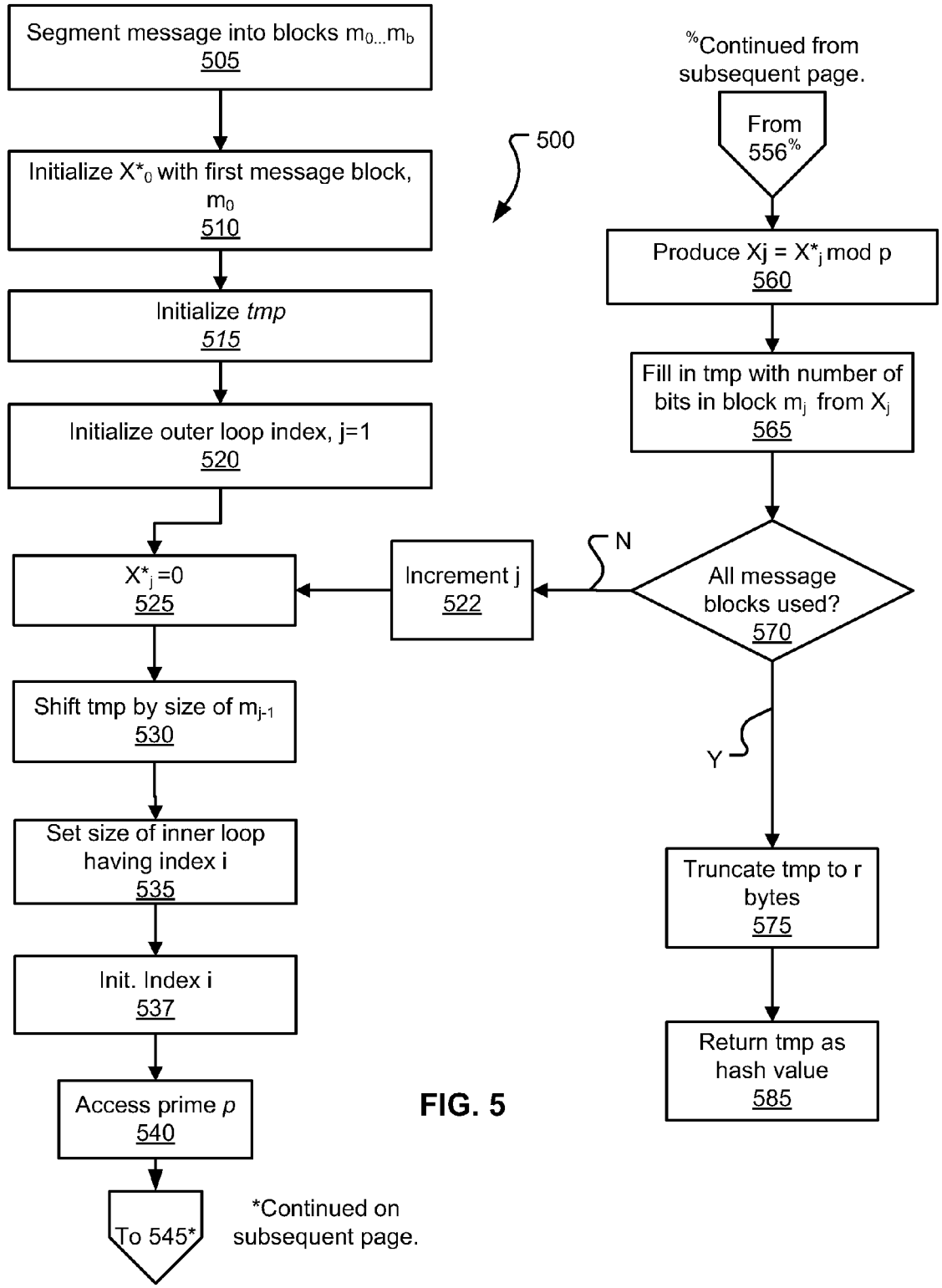
FIG. 5 depicts steps of a method implementing further hashing variations, including randomization, disclosed herein.
Figure 5:
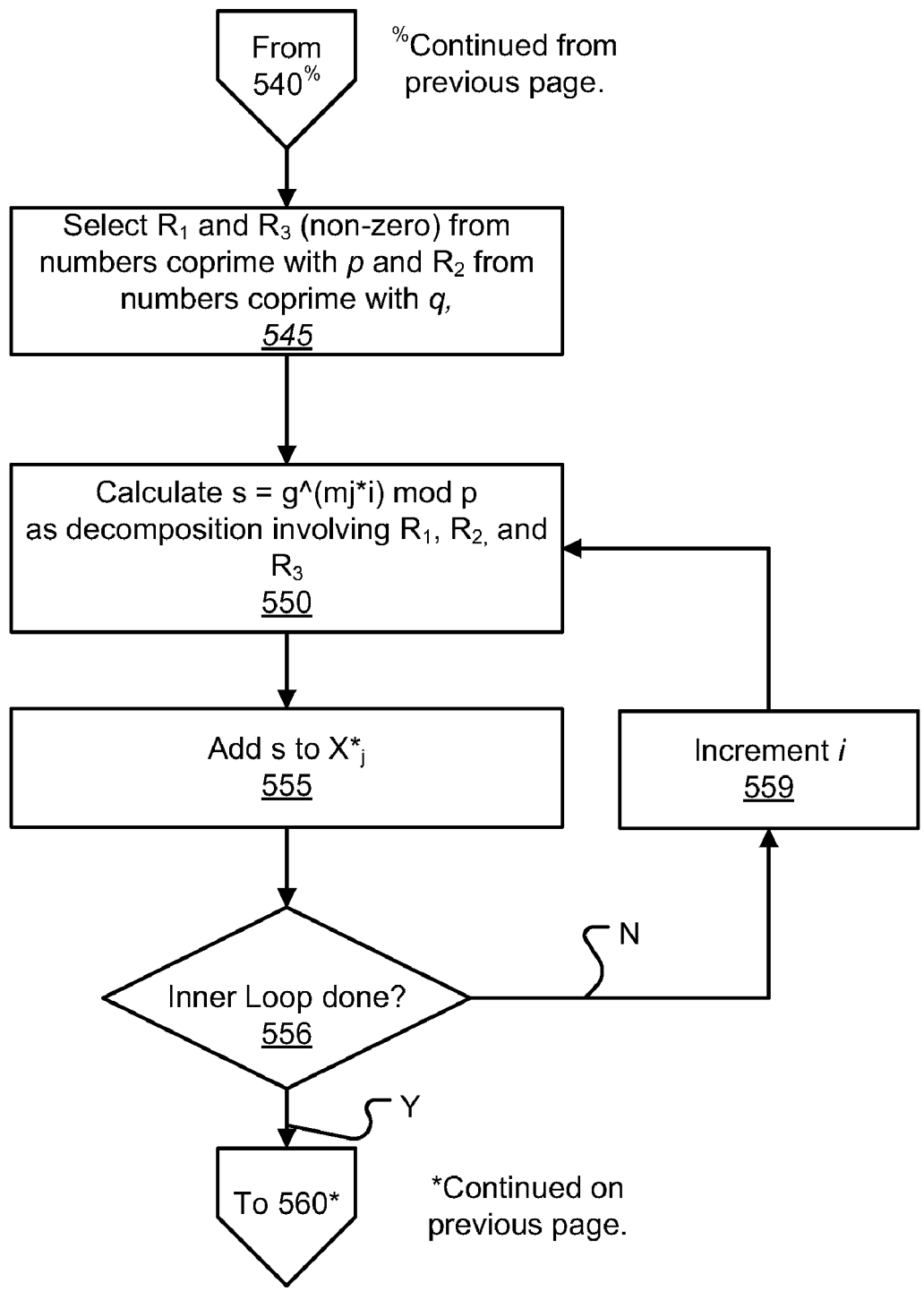

FIG. 5 illustrates a method 500 that exemplifies aspects of the pseudocode of Example 4, including variable block length, variable hash size, and randomizing portions of the computation.

Method 500 includes segmenting (505) a message into blocks $m_0$-$m_b$. Such blocks can have sizes different from each other. A block size can be set for each message, and can be selected based on characteristics of a compute resource performing the hash.

The method 500 also includes initializing (step 510) an $X^*_0$ based on a first message block. As explained further below, each $X^*$ (one for each block) refers to a hash value that includes randomization, while each block also has a corresponding X generated for it, which is obtained from $X^*$ by reducing modulo p after completion of each inner loop.

Returning to method 500, a bitstring tmp is initialized (step 515). The bitstring tmp can be initialized to a value based on $m_0$. The bitstring tmp receives a selectable portion of the X produced for each block, as explained below. An outer loop index, j, can be initialized (step 520) to 1, since the first block (j=0) was considered already.

Subsequently, an $X^*$ for the current block (i.e., $X^*_j$) can be initialized (step 525) to 0 (e.g., the bits of its binary representation can be initialized to all zeros).

The blocks $m_0$-$m_b$ can have a varying length, and tmp can be shifted (step 530) a number of bits determined based on a size of the previous message block ($m_{j-1}$). In some cases, tmp can be shifted a number of bits equal to a size of $m_{j-1}$, or some fraction or multiple thereof. In another example, tmp can be shifted according to a size of $m_j$. The amount that tmp is related to how many bits of each $X_j$ are incorporated into tmp, as explained further below.

A number of iterations to be performed in an inner loop is set (step 535). In an example, the inner loop size is set based on a function of a value of the $X^*$ resulting from the prior message block (i.e., for the current block $m_j$, the function uses $X^*_{j-1}$). The function can include using $X^*_{j-1}$ unmodified, reduced according to $X^*_{j-1}$ mod q, or to ($X^*_{j-1}$ mod q) further truncated by a selectable number of bits, as described above. Inner loop is indexed by the variable i, which is initialized (step 537).

Method 500 also includes accessing the prime p (step 540) and selecting (step 545) random numbers $R_1$, $R_2$, and $R_3$, as described above. Method 500 also includes producing (step 550) a modular exponentiation $s=g^{m_j i}$ mod p as a decomposition involving $R_1$, $R_2$, and $R_3$ (e.g., $s=(g+R_1 p)^{(m_j i + R_2 q)}$ mod $R_3 p$. The s calculated in the inner loop can be added (step 555) to $X^*_j$.

A determination is then made as to whether the inner loop is done (determination 556), and if it is not done, then the inner loop index i is incremented (step 559) and method 500 returns to step 550 for calculating another s value.

If the inner loop is done (determination 556), then the method proceeds to step 560, where an $X_j$ is produced from $X^*_j$ by reducing it (step 560) modulo p.

Then, a number of bits from $X_j$ can be selected and used to modify (step 565) tmp. For example, tmp can be shifted for a number of bits in message block $m_j$ or a function relating thereto, and then an appropriate number of bits of $X_j$ can be appended (see, e.g., the pseudocode of Example 4).

Thereafter, it is determined whether all message blocks have been considered (step 570), and if not, then the outer loop index j is incremented (step 522) and another outer loop is performed by returning to step 525, where the new $X^*_j$ is initialized.

If it determined in step 570 that all message blocks have been considered, then method 500 proceeds to truncate tmp to a length of r bytes (step 575) and return (step 585) as the hash value for the message.

As previously described, these examples show a particular looping and indexing approach. However, a variety of such approaches exist, and depending on the approach used, the outer loop may exit before a final modification of tmp with the last $X_j$ data. If so, then a final shift of tmp can be conducted and an appropriate portion of $X_j$ used. By further example, if the loop indexes were incremented at a beginning of the loop, then the initialization of the respective index and the condition tested can be adjusted accordingly.

In the preceding explanation, the illustrated looping, initialization and incrementing of indexes, and the like were exemplary and for illustration of the principles disclosed. For example, in each iteration of the outer loop in Example 3 (loop with index j), $X_j$ was initialized to 0, but could have been initialized to a different value. By further example, it was illustrated that tmp was shifted by a number of bits in a message block current being used. More generally, such shifting can be for a number of bits determined as a function of the number of bits in a current or previous message block, for example.

Also, the examples herein generally illustrated that an integer could be computed or selected (e.g., by a modular exponentiation in the form $g^{m_j i}$ mod p) and then added to a running total $X_j$ value, which after completion of the integer selection for a given block, also is reduced modulo p. The unreduced sum also can be maintained for controlling a number of integers selected for a subsequent message block.

In other implementations, a number of integers can be selected by calculating a number of $g^{m_j i}$ mod p (e.g., by incrementing i to arrive at a different integer), these integers can be summed, and that summation can be reduced. The increment can itself by varied, e.g., by selecting only evens or odds. Thereafter, that reduced sum can be added to an $X_j$ value. Randomization can be introduced into the summation of each successive integer. This approach would be expected to result in a different hash value than the previous example, but is a further example of a hash algorithm generally in accordance with this description. The addition of the summation, with or without reduction can be viewed as an update to the hash value for a current block.

Examples of primes p and q are provided below.

| | | |
|---|---|---|
| 1. | A 160 bit prime p with no subgroup | p = 730750818665451459101842416358141509829140171899 |
| 2. | A 384 bit prime p | p = 5365569131766637554013000415415454199398918811368884858776942802510661321098377022098033929121740680574160599594110185116354418092268698744131132745233230876373043 |
| | with 160 bit prime q subgroup | q = 730750818665451459101842416358141509828398694983 |
| 3. | A 512 bit prime p | p = 611168156573767359585416700229887716066726460180523342691493908235230643849273489785329166310718632298068808934560633054958197225990654299679748596513349983246403218438450570215791080103881369252322 77 |
| | with 160 bit prime q subgroup | q = 730750818665451459101842416358141509828027893137 |

Methods according to the above-described examples can be implemented using computer-executable instructions that are stored or otherwise available from computer readable media. Such instructions comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store information used or created during methods according to described examples include magnetic or optical disks, flash memory, USB devices provided with non-volatile memory, as well as networks of storage devices such as NAS or SAN equipment.

Such hardware, firmware and software can also be embodied in any of a variety of form factors and devices, including laptops, smart phones, small form factor personal computers, personal digital assistants, peer-to-peer computing, cloud computing, and so on. Functionality described herein also can be embodied in peripherals or add-in cards. Such functionality also can be implemented on a circuit board among different chips or different processes executing in a single device, by way of further example. The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

We claim:

1. A method for producing a message hash, comprising:
   segmenting a message into a sequence of blocks;
   accessing an integer g, wherein p is a first prime number, q is a second prime number not equal to 2 that divides p−1, and g is a generator of a subgroup, with order q, of the group of integers less than p;
   initializing a first intermediate hash value based on a first block of the sequence;
   for each remaining block in the sequence, initializing a respective intermediate hash value, selecting a number of integers from the subgroup generated by g, adding each of the number of integers to the respective intermediate hash value to yield a sum, and reducing the sum modulo a value related to p, wherein the number of integers selected for each remaining block depends on the respective intermediate hash value of a prior block, and wherein selecting the number of integers is based at least on a current block of the message; and
   returning, via a processor, a hash value of the message derived from a selection of bits based at least on a last-produced intermediate hash.

2. The method of claim 1, further comprising
   executing a loop to be performed a number of times less than the respective intermediate hash value of the prior block, wherein the selecting comprises selecting one integer in each execution of the loop by a modular exponentiation calculating $s=g^{\wedge}(m_j*i) \bmod p$, and wherein $m_j$ is the value of the current block, and i is an index for the loop; and
   the sum is generated by keeping a running total, $X_j$, of the calculated s values.

3. The method of claim 2, wherein the running total is reduced modulo p to yield respectively reduced running totals, wherein the running total is reduced at least prior to commencement of the loop for a subsequent message block, and the respectively reduced running totals provide the respective sources of the bits selected from each intermediate hash.

4. The method of claim 3, wherein the number of integers selected for each block depends on the running total for the prior block before it is reduced modulo p.

5. The method of claim 2, wherein the number of times the loop is to be executed is determined by reducing a previous hash value modulo q.

6. The method of claim 5, wherein the number of times the loop is to be executed is further reduced by a power of 2.

7. The method of claim 1, wherein selecting the number of integers is performed in an inner loop associated with an inner loop index, and wherein the inner loop is iterated up to a number of times determined by the intermediate hash value of the prior block, the selecting of each integer comprising a modular exponentiation of g to a power determined by the value of the current block of the message multiplied by the inner loop index.

8. The method of claim 7, further comprising providing an outer loop with an outer loop index, wherein the outer loop is iterated once for each block of the message, the iterating of the outer loop comprising performing the inner loop.

9. The method of claim 1, further comprising:
   implementing a running total, $X^*_j$, as $X^*_j = X^*_j + (g + R_1 p)^{(m_j + R_2 q)} \bmod R_3 p$, wherein $R_1$ and $R_3$ are integers coprime with p, $R_2$ is coprime with q, $R_3$ is not zero;
   summing the selected integers for each respective block; and
   reducing the running total $X^*_j$ modulo p to obtain the value derived from the intermediate hash value.

10. The method of claim 9, further comprising at least one of randomly and pseudorandomly selecting $R_1$ and $R_3$ from the integers less than p, and at least one of randomly and pseudorandomly selecting $R_2$ from the integers less than q.

11. The method of claim 1, wherein the hash value is also derived from a selection of bits based on an intermediate hash value produced for another block.

12. A non-transitory computer-readable storage medium storing instructions which, when executed by a computing device, cause the computing device to perform steps comprising:
   segmenting a message into an ordered plurality of blocks;
   accessing an integer g, wherein p is a first prime number, q is a second prime number not equal to 2 that divides p−1, and g is a generator of a subgroup with order q of the group of integers less than p;
   providing an outer loop, with an index j, in which is calculated a respective hash value, $X_j$, for each message block of the plurality of blocks;

providing an inner loop, with an index i, to be executed for a number of times determined based at least on a value of $X_{j-1}$;

calculating $X_j$ by (1) implementing a modular exponentiation of g to a power determined as a function of a current block of the message and i to yield a result, (2) adding the result to $X_j$ from the i−1 iteration of the inner loop, and (3) reducing $X_j$ modulo p so that $X_j$ is less than p;

selecting bits of the $X_j$ value up to a number of bits in the current block of the message;

incorporating the bits into an intermediate message hash;

incrementing j so that each block of the message is processed; and selectively retaining a number of bits of the intermediate message hash, after completing all iterations of the outer loop; and outputting those bits as a message hash.

13. The non-transitory computer-readable storage medium of claim 12, wherein the instructions for implementing (1) and (2) include instructions for performing a calculation in the form $(g+R_1 p)^{(m_j i+R_2 q)} \mod R_3 p$, wherein $R_1$ and $R_3$ are integers coprime with p, $R_3$ is not zero and $R_2$ is coprime with q.

14. The non-transitory computer-readable storage medium of claim 13, wherein $R_1$ and $R_3$ are selected at least one of randomly and pseudorandomly from integers less than p, and $R_2$ is selected at least one of randomly and pseudorandomly from integers less than q.

15. The non-transitory computer-readable storage medium of claim 12, wherein the instructions for providing the second loop cause the number of second loop iterations to be based on $X_{j-1}$ reduced modulo q.

16. The non-transitory computer-readable storage medium of claim 15, wherein the number of second loop iterations is further reduced modulo a power of 2.

17. The non-transitory computer-readable storage medium of claim 12, wherein the instructions for incorporating the selected $X_j$ bits comprise instructions for shifting an existing value of the intermediate message hash by a selectable number of bits to yield a shifted intermediate message hash, and appending the selected number of bits from $X_j$ bits to the shifted intermediate message hash.

18. The non-transitory computer-readable storage medium of claim 12, wherein the power is determined by multiplying the current block value with i.

19. The non-transitory computer-readable storage medium of claim 12, further comprising instructions for padding the message to be executed prior to the instructions for segmenting.

20. The non-transitory computer-readable storage medium of claim 12, further comprising instructions for initialization of $X_j$, j=0, to a value of a first message block.

21. The non-transitory computer-readable storage medium of claim 12, wherein the instructions for segmenting are operable for segmenting into differently-sized blocks.

22. The non-transitory computer-readable storage medium of claim 12, further comprising instructions for using the message hash as an identifier for a file.

23. A method for producing a hash from a message, comprising:

segmenting the message into an ordered plurality of blocks;

accessing an integer g, wherein p is a first prime number, q is a second prime number not equal to 2 that divides p−1, and g is a generator of an integer subgroup, with order q, of the group of integers less than p;

calculating a current hash value for association with each block of the message by steps comprising:
  (1) incrementing an index indicative of a current block;
  (2) providing an inner loop in which a selection of a number of elements of the integer subgroup is made, wherein the selection is based at least in part on a value of the current block, and an inner loop index is incremented with each element selection;
  (3) summing the elements selected to yield a sum, wherein the number of elements selected for each message block is based on a respective sum value calculated for a previous block of the message;
  (4) producing a modulo p reduction of the sum;
  (5) selecting bits of the modulo p reduction;
  (6) incorporating the bits into a bitstring; and
  returning to (1) until all blocks of the message have been processed;

retaining a determined number of bits from the bitstring, to yield retained bits; and returning, via a processor, the retained bits as a message hash.

24. The method of claim 23, wherein the incorporating is performed by shifting the bitstring by a number of bits, and performing a Boolean operation between the bits and the shifted bitstring.

25. The method of claim 24, wherein the Boolean operation is selected from an OR, and XOR, and an AND operation.

26. The method of claim 23, wherein the message blocks can vary in size, and a number of bits selected is determined based on a number of bits in either the current block or the previous block of the message.

27. The method of claim 23, wherein the sum for a $j^{th}$ block is $X^*_j$, wherein $X^*_j$ is calculated incrementally in the inner loop by
$X^*_j = X^*_j + (g+R_1 p)^{(m_j i+R_2 q)} \mod R_3 p$, and wherein $R_1$ and $R_3$ are integers coprime with p, $R_3$ is non-zero, and $R_2$ is coprime with q.

28. A system:
a processor;
a memory storing instructions for controlling the processor to perform steps comprising:
  segmenting a message into a plurality of blocks, wherein the plurality of blocks is associated with an integer g, wherein p is a first prime number, q is a second prime number not equal to 2 that divides p−1 and g is a generator of a subgroup, with order q, of a group of integers less than p;
  accessing a next message block in turn and for that block determining a block-specific hash value for the next message block by incrementally selecting a number of integers from the subgroup by raising g to a power based on contents of a next block, and an index i that is incremented for each integer selected, producing a value related to the sum of the selected integers modulo p to arrive at the block-specific hash value, reducing the value modulo p, wherein the number of integers selected is determined based on contents of the block-specific hash value for a prior message block;
  incorporating at least a portion of the block-specific hash value for the next block into a bitstring and returning to the accessing until the plurality of blocks have been processed; and
  outputting a selection from the bitstring as the hash value for the message.

29. The system of claim 28, wherein the value related to the sum is a running total, $X^*_j$, of each selected integer.

30. The system of claim 29, wherein the instructions implement the running total $X^*_j$ in an operation of the form $X^*_j = X^*_j + (g+R_1 p)^{(m_j i + R_2 q)}) \mod R_3 p$, wherein $R_1$ and $R_3$ are integers coprime with p, $R_3$ is non-zero, $R_2$ is coprime with q, $m_j$ represents contents of a current message block and i represents an index incremented for each integer selected.

31. The system of claim 30, wherein each $X^*_j$ is reduced modulo p to produce $X_j$, and wherein $X_j$ is used as the block-specific hash value.

32. The system of claim 28, wherein the instructions incorporate the portion of the block-specific hash value into the bitstring by shifting the bitstring by a determined number of bits and appending the determined number of bits to the bitstring.

33. The system of claim 28, wherein the instructions incorporate the portion of the block-specific hash value into the bitstring by selecting a determined number of bits from the block-specific hash value and performing a Boolean operation between an existing value of the bitstring and the determined number of bits.

* * * * *